United States Patent
Takai

(10) Patent No.: US 9,511,424 B2
(45) Date of Patent: Dec. 6, 2016

(54) DRILL

(75) Inventor: Kazuteru Takai, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 291 days.

(21) Appl. No.: 14/353,399

(22) PCT Filed: Nov. 4, 2011

(86) PCT No.: PCT/JP2011/075518
§ 371 (c)(1),
(2), (4) Date: Apr. 22, 2014

(87) PCT Pub. No.: WO2013/065201
PCT Pub. Date: May 10, 2013

(65) Prior Publication Data
US 2014/0294529 A1  Oct. 2, 2014

(51) Int. Cl.
*B23B 51/02* (2006.01)

(52) U.S. Cl.
CPC ............ *B23B 51/02* (2013.01); *B23B 2222/80* (2013.01); *B23B 2224/24* (2013.01);
(Continued)

(58) Field of Classification Search
CPC .. B23B 51/02; B23B 2228/10; B23B 2251/04; B23B 2251/14; B23B 2251/18; B23B 2251/122; B23B 2251/082; B23B 2251/40; B23B 2251/406; Y10T 408/9097
See application file for complete search history.

(56) References Cited

U.S. PATENT DOCUMENTS 2,859,645 A * 11/1958 Emmons ................ B23B 51/02
                                                               408/230
4,065,224 A   12/1977 Siddall
(Continued)

FOREIGN PATENT DOCUMENTS

CN      1396030 A    2/2003
CN    101821043 A    9/2010
(Continued)

OTHER PUBLICATIONS

Nov. 8, 2011 International Search Report issued in International Patent Application No. PCT/JP2011/070296.
(Continued)

*Primary Examiner* — Eric A Gates
(74) *Attorney, Agent, or Firm* — Oliff PLC

(57) ABSTRACT

A drill including: a chip discharge flute; and a cutting edge, the cutting edge being made up of a concavely-curved cutting edge portion formed on an inner circumferential side and a convexly-curved cutting edge portion formed on an outer circumferential side, the drill further including a cross section orthogonal to an axial center having a first convex curve corresponding to the convexly-curved cutting edge portion and a first concave curve corresponding to the concavely-curved cutting edge portion intersecting with each other, a flank following the cutting edge on the tip surface having an orthogonal clearance angle β formed within an angular range of 9 to 20 degrees, and a ridgeline of the cutting edge having a chamfer formed with a width CW within a range of 0.002D to 0.02D (where D is a drill diameter).

12 Claims, 13 Drawing Sheets

(52) U.S. Cl.
CPC ....... *B23B 2228/10* (2013.01); *B23B 2251/04* (2013.01); *B23B 2251/082* (2013.01); *B23B 2251/085* (2013.01); *B23B 2251/122* (2013.01); *B23B 2251/14* (2013.01); *B23B 2251/18* (2013.01); *B23B 2251/40* (2013.01); *B23B 2251/406* (2013.01); *Y10T 408/9095* (2015.01)

(56) References Cited

U.S. PATENT DOCUMENTS

| | | | |
|---|---|---|---|
| 4,975,003 A | 12/1990 | Hosoi | |
| 5,160,232 A * | 11/1992 | Maier | B23B 51/02 407/54 |
| 5,230,593 A | 7/1993 | Imanaga et al. | |
| 5,678,960 A * | 10/1997 | Just | B23B 51/02 408/147 |
| 6,213,692 B1 | 4/2001 | Guehring et al. | |
| 6,309,149 B1 | 10/2001 | Borschert et al. | |
| 6,315,504 B1 | 11/2001 | Sekiguchi et al. | |
| 6,916,139 B2 * | 7/2005 | Yanagida | B23B 51/02 408/227 |
| 6,923,602 B2 * | 8/2005 | Osawa | B23B 51/02 408/230 |
| 7,201,543 B2 * | 4/2007 | Muhlfriedel | B23B 51/02 408/227 |
| 7,214,006 B2 | 5/2007 | Flynn | |
| 7,762,748 B2 * | 7/2010 | Yanagida | B23B 51/06 408/230 |
| 9,216,460 B2 * | 12/2015 | Matsuda | B23B 51/06 |
| 2003/0039522 A1 | 2/2003 | Yanagida et al. | |
| 2003/0215297 A1 | 11/2003 | Frisendahl | |
| 2005/0135889 A1 | 6/2005 | Turrini et al. | |
| 2006/0269372 A1 | 11/2006 | Goshima | |
| 2008/0199268 A1 * | 8/2008 | Krenzer | B23B 51/02 408/230 |
| 2010/0215452 A1 | 8/2010 | Jindai et al. | |
| 2011/0170974 A1 | 7/2011 | Masuda | |

FOREIGN PATENT DOCUMENTS

| | | |
|---|---|---|
| CN | 102170989 A | 8/2011 |
| DE | 3826239 A1 | 2/1990 |
| EP | 0 320 881 A2 | 6/1989 |
| EP | 1 275 458 A1 | 1/2003 |
| FR | 2 793 176 A1 | 11/2000 |
| JP | A-63-89211 | 4/1988 |
| JP | S63-93509 A | 4/1988 |
| JP | S64-5708 A | 1/1989 |
| JP | A-2000-198011 | 7/2000 |
| JP | A-2003-25125 | 1/2003 |
| JP | 2003-220507 A | 8/2003 |
| JP | 2003-266224 A | 9/2003 |
| JP | 2003285211 A * | 10/2003 |
| JP | 2006-110704 A | 4/2006 |
| JP | 2006-136965 A | 6/2006 |
| JP | A-2006-326790 | 12/2006 |
| JP | 2007-301706 A | 11/2007 |
| WO | WO 2010/038279 A1 | 4/2010 |
| WO | WO 2010146839 A1 * | 12/2010 ............. B23B 51/06 |

OTHER PUBLICATIONS

Nov. 8, 2011 Written Opinion issued in International Patent Application No. PCT/JP2011/070296.
Jan. 17, 2012 Written Opinion issued in International Patent Application No. PCT/JP2011/075518.
Dec. 2, 2014 Office Action issued in Japanese Application No. 2013-541583.
Mar. 23, 2015 Extended Search Report issued in European Patent Application No. 11872005.1.
Mar. 16, 2015 Office Action issued in Chinese Patent Application no. 201180073268.2.
Sep. 22, 2015 Office Action issued in U.S. Appl. No. 14/342,029.
U.S. Appl. No. 14/342,029, filed Feb. 28, 2014 in the name of Takai et al.
International Search Report issued in International Patent Application No. PCT/JP2011/075518 dated Jan. 17, 2012.
May 27, 2015 Office Action issued in Chinese Application No. 201180074644.X.
Jun. 23, 2015 Extended Search Report issued in European Application No. 11874910.0.
Mar. 18, 2016 Office Action issued in U.S. Appl. No. 14/342,029.
Jul. 14, 2016 Notice of Allowance issued in U.S. Appl. No. 14/342,029.

* cited by examiner

FIG.17

| No. | END CUTTING EDGE FORMING ELEMENTS | | | | | |
|---|---|---|---|---|---|---|
| | β | CW | γ | R | BT | MW |
| 1 | 8° | 0.006D | 25° | 0.03D | 0.38L/100 | 0.04D |
| 2 | 10° | 0.006D | 25° | 0.03D | 0.38L/100 | 0.04D |
| 3 | 13° | 0.006D | 25° | 0.03D | 0.38L/100 | 0.04D |
| 4 | 18° | 0.006D | 25° | 0.03D | 0.38L/100 | 0.04D |
| 5 | 22° | 0.006D | 25° | 0.03D | 0.38L/100 | 0.04D |
| 6 | 13° | 0.001D | 25° | 0.03D | 0.38L/100 | 0.04D |
| 7 | 13° | 0.003D | 25° | 0.03D | 0.38L/100 | 0.04D |
| 8 | 14° | 0.006D | 26° | 0.04D | 0.38L/101 | 0.05D |
| 9 | 13° | 0.018D | 25° | 0.03D | 0.38L/100 | 0.04D |
| 10 | 13° | 0.03D | 25° | 0.03D | 0.38L/100 | 0.04D |
| 11 | 13° | 0.006D | 8° | 0.03D | 0.38L/100 | 0.04D |
| 12 | 13° | 0.006D | 40° | 0.03D | 0.38L/100 | 0.04D |
| 13 | 13° | 0.006D | 25° | 0 | 0.38L/100 | 0.04D |
| 14 | 13° | 0.006D | 25° | 0.06D | 0.38L/100 | 0.04D |
| 15 | 13° | 0.006D | 25° | 0.03D | 0.08L/100 | 0.04D |
| 16 | 13° | 0.006D | 25° | 0.03D | 0.55L/100 | 0.04D |
| 17 | 13° | 0.006D | 25° | 0.03D | 0.38L/100 | 0.01D |
| 18 | 13° | 0.006D | 25° | 0.03D | 0.38L/100 | 0.12D |

FIG.18

| No. | CUTTING TEST RESULT | | |
|---|---|---|---|
| | CHIP SHAPE | THRUST LOAD | DURABILITY PERFORMANCE |
| 1 | ○ | △ | △: SIGNIFICANT FLANK WEAR WIDTH |
| 2 | ○ | ○ | ○ |
| 3 | ○ | ○ | ○ |
| 4 | ○ | ○ | ○ |
| 5 | ○ | ○ | △:CUTTING EDGE CRACK |
| 6 | △ | ○ | △:CUTTING EDGE CRACK |
| 7 | ○ | ○ | ○ |
| 8 | ○ | ○ | ○ |
| 9 | ○ | ○ | ○ |
| 10 | △ | × | × |
| 11 | △ | × | × |
| 12 | △ | △ | △:CUTTING EDGE CRACK |
| 13 | △ | △ | × |
| 14 | △ | × | △:CENTER PORTION CRACK |
| 15 | ○ | △ | × |
| 16 | ○ | △ | △:HOLE DIAMETER EXPANSION |
| 17 | ○ | ○ | △:HOLE DIAMETER EXPANSION |
| 18 | ○ | △ | × |

FIG.19

| No. | FLUTE FORM FORMING ELEMENTS (RATE × D) | | | | | | | |
|---|---|---|---|---|---|---|---|---|
| | R1 | R2 | R3 | R4 | R3/R2 | WEB THICKNESS CD | LF | LW |
| 1 | 0.16D | 0.29D | 0.29D | 0.21D | 1 | 0.28D | 0.02D | 0.05D |
| 2 | 0.16D | 0.29D | 0.24D | 0.21D | 0.83 | 0.28D | 0.02D | 0.05D |
| 3 | 0.16D | 0.29D | 0.35D | 0.21D | 1.21 | 0.28D | 0.02D | 0.05D |
| 4 | 0.16D | 0.29D | 0.20D | 0.21D | 0.7 | 0.28D | 0.02D | 0.05D |
| 5 | 0.16D | 0.29D | 0.38D | 0.21D | 1.3 | 0.28D | 0.02D | 0.05D |
| 6 | 0.018D | 0.29D | 0.29D | 0.21D | 1 | 0.28D | 0.04D | 0.005D |
| 7 | 0.16D | 0.19D | 0.29D | 0.21D | 1.53 | 0.28D | 0.06D | 0.05D |
| 8 | 0.42D | 0.29D | 0.29D | 0.21D | 1 | 0.28D | 0.02D | 0.05D |
| 9 | 0.16D | 0.52D | 0.29D | 0.21D | 0.56 | 0.28D | −0.02D | 0.09D |
| 10 | 0.16D | 0.29D | 0.31D | 0.21D | 1.07 | 0.13D | 0.04D | 0.05D |
| 11 | 0.16D | 0.29D | 0.31D | 0.21D | 1.07 | 0.42D | 0 | 0.05D |
| 12 | 0.38D | 0.14D | 0.29D | 0.21D | 0.48 | 0.28D | 0.06D | 0.12D |

FIG.20

| No. | CUTTING TEST RESULT | | |
|---|---|---|---|
| | CHIP SHAPE | THRUST LOAD | DURABILITY PERFORMANCE |
| 1 | ○ | ○ | ○ |
| 2 | ○ | ○ | ○ |
| 3 | ○ | ○ | ○ |
| 4 | △ | △ | ×:BREAKAGE DUE TO CLOGGING |
| 5 | △ | △ | ×:BREAKAGE DUE TO RIGIDITY SHORTAGE |
| 6 | ○ | △ | △:CORNER PORTION CRACK |
| 7 | △ | △ | △:CORNER PORTION CRACK |
| 8 | ○ | △ | △:CORNER PORTION CRACK |
| 9 | × | × | △:SIGNIFICANT WEAR |
| 10 | ○ | △ | ×:BREAKAGE |
| 11 | △ | × | ×:BREAKAGE |
| 12 | △ | × | △:CORNER PORTION CRACK |

DRILL

TECHNICAL FIELD

The present invention relates to a drill that is a rotary cutting tool for hole machining through cutting and is particularly related to a technique of forming chips into a curled short shape without a needle-like projection and smoothly discharging the chips to suppress damage of a drill and further improve a tool life.

BACKGROUND ART

A drill frequently used as a hole machining cutting tool is disposed with a cutting edge at an axial tip and a chip discharge flute in an outer circumferential surface in an axial direction and is rotated around an axial center to perform cutting with the cutting edge at the tip while discharging chips through the chip discharge flute.

Drills described in Patent Documents 1 and 2 are examples thereof. These drills have an inner circumferential portion of a cutting edge formed into a concave curve and an outer circumferential portion of the cutting edge formed into a convex corner shape to define an obtuse intersection angle between an inner wall surface of the chip discharge flute and a margin portion on a drill cross section and is considered to achieve curling of chips and an improvement in strength of the outer circumferential portion of the cutting edge and to have drill durability. However, since a corner convex portion is disposed on the outer circumferential portion of the cutting edge, generated chips tend to be segmented at a portion corresponding to the corner convex portion, tangling with each other to generate clogging of chips, and since the chips cut on an outer circumferential side relative to the corner convex portion are caused to flow toward an outer circumference, poor curling property and low discharge property may make a resistance applied to the drills larger, compromising the drill durability.

In this regard, a drill described in Patent Document 3 has been proposed. This drill has a convexly-curved cutting edge portion formed into a convexly-curved shape convexed in a drill rotation direction on an outer circumferential end side of a cutting edge and has a concavely-curved cutting edge portion formed into a concavely-curved shape concaved in the drill rotation direction on an inner circumferential side of the convexly-curved cutting edge portion, and the convexly-curved cutting edge portion and the concavely-curved cutting edge portion are smoothly continued. Therefore, an obtuse intersection angle is made between the cutting edge and a margin portion on an outer circumference of a drill main body, increasing a strength to prevent cracking and chipping from occurring, and since the chips cut by the cutting edge are not segmented at the inner/outer circumferences of the cutting edge and the chips are rolled into the inner circumferential side and sufficiently curled by the convexly-curved cutting edge portion, the chips are smoothly discharged and the tool durability is considered to be enhanced.

PRIOR ART DOCUMENTS

Patent Documents

Patent Document 1: Japanese Laid-Open Patent Publication No. 2000-198011
Patent Document 2: Japanese Laid-Open Patent Publication No. 2006-326790
Patent Document 3: Japanese Laid-Open Patent Publication No. 2003-025125

SUMMARY OF THE INVENTION

Problem to be Solved by the Invention

However, although the conventional drill described in Patent Document 3 curls chips generated from the cutting edge, since the chips include those having a longer overall length with a needle-like projection like chips generated by a straight cutting edge at a high proportion, the discharge property of chips is still insufficient and cracking and chipping occur in the drill in the course of repeating the cutting, resulting in a problem of the durability of the drill considered not necessarily sufficient. Such a problem becomes particularly prominent in a long drill for deep hole machining.

The present invention was conceived in view of the situations and it is therefore an object of the present invention to provide a drill that produces curled uniformly-shaped chips with short overall length and that more smoothly discharges the chips to further improve a tool life.

Means for Solving the Problem

To achieve the object, the present invention provides a drill comprising: a chip discharge flute opened in a tip surface; and a cutting edge formed at an intersecting portion between an inner wall surface of the chip discharge flute on a side toward a drill rotation direction and a tip flank formed on the tip surface, the cutting edge being made up of a concavely-curved cutting edge portion formed on an inner circumferential side and a convexly-curved cutting edge portion formed on an outer circumferential side, wherein a cross section orthogonal to an axial center has a first convex curve corresponding to the convexly-curved cutting edge portion and a first concave curve corresponding to the concavely-curved cutting edge portion intersecting with each other, wherein a flank following the cutting edge on the tip surface has an orthogonal clearance angle β formed within an angular range of 9 to 20 degrees, and wherein a ridgeline of the cutting edge has a chamfer formed with a width CW within a range of 0.002D to 0.02D (where D is a drill diameter).

Effects of the Invention

Since the drill of this invention including the chip discharge flute opened in the tip surface and the cutting edge formed on the intersecting portion of the chip discharge flute between the inner wall surface toward the drill rotation direction and the tip flank formed on the tip surface, having the cutting edge made up of the concavely-curved cutting edge portion formed on the inner circumferential side and the convexly-curved cutting edge portion formed on the outer circumferential side has the first convex curve corresponding to the convexly-curved cutting edge portion and the first concave curve corresponding to the concavely-curved cutting edge portion intersecting with each other in the cross section orthogonal to the axial center thereof, chips generated from the cutting edge have a uniform shape curled without a needle-like projection with a correspondingly shortened overall length and are smoothly discharged with enhanced discharge property and, therefore, the tool life of the drill is further improved. Since the flank following the cutting edge on the tip surface is provided with the orthogonal clearance angle β within an angular range of 9 to 20 degrees and the ridgeline of the cutting edge is provided with the chamfer having the chamfer width CW within a range of 0.002D to 0.02D, wear and cutting edge crack of the flank are suppressed and cutting resistance is reduced, resulting in suppression of the breakage of the drill. If the orthogonal clearance angle of the flank falls below 9 degrees, the wear of the flank increases and a sufficient tool life cannot be acquired. If the orthogonal clearance angle β of the flank exceeds 20 degrees or if the chamfer width CW of the cutting edge falls below 0.002D, the cutting edge crack is caused and, if the chamfer width CW of the cutting edge exceeds 0.02D, the cutting resistance increases and the breakage of the drill tends to occur.

Preferably, the cross section orthogonal to the axial center has a concave amount LF of the first concave curve set to 0.01D to 0.05D (where D is a drill cutting diameter) relative to a reference line connecting an outer circumferential point, at which an outer circumferential surface of the drill intersects with the first convex curve, and a drill center point. Consequently, the chip shape is curled with a relatively shorter overall length and a durability performance is enhanced while a thrust load during cutting is reduced. If the concave amount LF of the first concave curve becomes less than 0.01D, the wear of the drill increases and the durability performance deteriorates, and if the concave amount LF exceeds 0.05D, the corner portion easily cracks.

Preferably, the cross section orthogonal to the axial center has a rake chamfer width LW of 0.008D to 0.06D (where D is a drill cutting diameter) that is a distance from an intersection between a straight line orthogonal to the reference line, which passes through an intersection of the first convex curve and the first concave curve, and the reference line, to the outer circumferential point. Consequently, the chip shape is curled with a relatively shorter overall length and the durability performance is enhanced while the thrust load during cutting is reduced. If the rake chamfer width LW becomes less than 0.008D, the corner portion easily cracks, and if the rake chamfer width LW exceeds 0.06D, the wear of the drill increases and the durability performance deteriorates.

Preferably, the tip surface includes a flank disposed on a rear side of the rotation direction of the cutting edge, a gash surface formed adjacently to the flank with a clearance angle larger than the flank, a thinning surface adjacent to an inner circumferential portion of another cutting edge located on the rear side of the rotation direction of the cutting edge, and a longitudinal connecting concave surface located along a boundary line between the gash surface and the thinning surface to connect the both surfaces and concaved in a width direction, and wherein the connecting concave surface has a curvature radius R within a range of 0.01D to 0.05D. Consequently, since the curvature radius R of the connecting concave surface is 0.01D to 0.05D, the lower cutting resistance leads to the prevention of the breakage of the drill and the prevention of the crack of a center portion near the axial center of the cutting edge. If the curvature radius R falls below 0.01D, the discharge property in cutting deteriorates and the cutting resistance increases, and if the curvature radius R exceeds 0.05D, the strength deteriorates in the center portion near the axial center of the cutting edge and the portion tends to crack.

Preferably, the outer circumferential surface of the drill is provided with a margin having a margin width MW of 0.02D to 0.10D and a back taper BT of 0.10L/100 to 0.50L/100 (where L is an axial length of the back taper). Consequently, since the cutting resistance is reduced and the expansion of a hole diameter is suppressed. If the back taper BT falls below 0.10L/100, the cutting resistance increases and the breakage of the drill is more likely to occur, and if the back taper BT exceeds 0.50L/100, the cut hole diameter increases and a machining accuracy deteriorates.

Preferably, the drill has a web thickness CD of 0.15D to 0.4D (where D is a drill cutting diameter). Consequently, since transverse strength of the drill is enhanced within a range in which chip discharge performance is achieved, the durability performance of the drill is enhanced. If the web thickness CD falls below 0.15D, the strength of the drill is reduced and the breakage tends to occur and if the web thickness CD exceeds 0.4D, the chip discharge performance deteriorates and the breakage tends to occur.

Preferably, the chamfer disposed on the ridgeline of the cutting edge has a cutting edge chamfer angle γ of 10 to 35 degrees. The cutting edge chamfer angle γ is a supplementary angle of the angle relative to a rotation surface of the cutting edge on the plane orthogonal to the cutting edge. Therefore, since the strength of the cutting edge is improved within a range in which the cutting edge crack is prevented, the durability performance of the drill is enhanced. If the cutting edge chamfer angle γ falls below 10 degrees, the strength of the cutting edge is reduced and the cutting edge tends to crack, and if the cutting edge chamfer angle γ exceeds 35 degrees, the cutting resistance increases and the breakage of the drill tends to occur.

Preferably, the cross section orthogonal to the axial center has the inner wall surface of the chip discharge flute on the side toward rotation direction opposite to the drill rotation direction made up of a second concave curve formed on the inner circumferential side and a second convex curve formed on the outer circumferential side adjacently to the second concave curve and reaching a heel portion, and wherein the second convex curve smoothly connects via the second concave curve to the first concave curve. Consequently, the chip shape is curled with a relatively shorter overall length and the durability performance is enhanced while the thrust load during cutting is reduced, and since the first convex curve and the second convex curve respectively reinforce the corner portion corresponding to the both end portions, i.e., the heel portion and the margin portion, of an opening edge opened in a C-shape or a U-shape in the tip surface of the chip discharge flute, the corner portion and the margin portion is prevented from cracking and the durability of the drill is enhanced.

Preferably, when R1, R2, R3, and R4 are a curvature radius of the first convex curve, a curvature radius of the first concave curve, a curvature radius of the second concave curve, and a curvature radius of the second convex curve, respectively, the drill is set to R1: 0.02D to 0.4D and R2: 0.15D to 0.5D. Consequently, the chip shape is curled with a relatively shorter overall length and the durability performance is enhanced while the thrust load during cutting is reduced. If the curvature radius R1 of the first convex curve becomes less than 0.02D or exceeds 0.4D, the corner portion easily cracks, and if the curvature radius R2 of the first concave curve becomes less than 0.15D, the corner portion easily cracks and if the curvature radius R2 of the first concave curve exceeds 0.5D, the wear becomes significant.

Preferably, a relationship between the curvature radius R2 of the first concave curve and the curvature radius R3 of the second concave curve is 0.75≤R3/R2≤1.25. Consequently, the chip discharge flute is formed into a cross section shape having a size without clogging of chips within a range in which rigidity of the drill is ensured. If R3/R2 becomes less than 0.75, the cross section area of the chip discharge flute becomes too small and the clogging of chips occurs and causes the breakage of the drill. If R3/R2 exceeds 1.25, the cross section area of the chip discharge flute 18 becomes larger and the cross section area of the drill main body becomes smaller, causing the breakage of the drill due to rigidity shortage.

Preferably, a rake angle is an angle between the reference line and the first convex curve at the outer circumferential point and is set to be negative. Consequently, the strength of the corner portion corresponding to the outer circumferential point is enhanced to prevent the crack thereof and the durability performance of the drill is enhanced.

Preferably, the drill is coated at least on a tip portion surface with a hard film. Consequently, the surface of the tip portion subjected to higher pressure and friction is coated with the hard film and, therefore, the durability performance of the drill is enhanced.

BRIEF DESCRIPTION OF THE DRAWINGS

FIG. 17 is a diagram depicting each range of eighteen types of hooked cutting edge drills (TYPE-2) No. 1 to No. 18 having a mutually different shape, used in a cutting test 2.

FIG. 18 is a diagram depicting a result of the cutting test 2 for each of the eighteen types of hooked cutting edge drills (TYPE-2) No. 1 to No. 18.

FIG. 19 is a diagram depicting each range of twelve types of hooked cutting edge drills (TYPE-2) No. 1 to No. 12 having a mutually different shape, used in a cutting test 3.

FIG. 20 is a diagram depicting a result of the cutting test 3 for each of the twelve types of drills (TYPE-2) No. 1 to No. 12.

MODE FOR CARRYING OUT THE INVENTION

An example of the present invention will now be described in detail with reference to the drawings.

EXAMPLE

Figure 1:
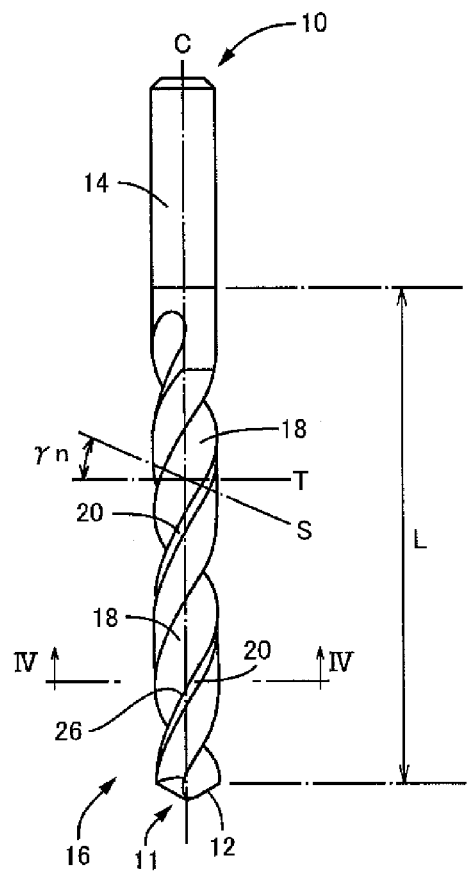
FIG. 1 is a front view of a drill that is an example of the present invention.
Figure 2:
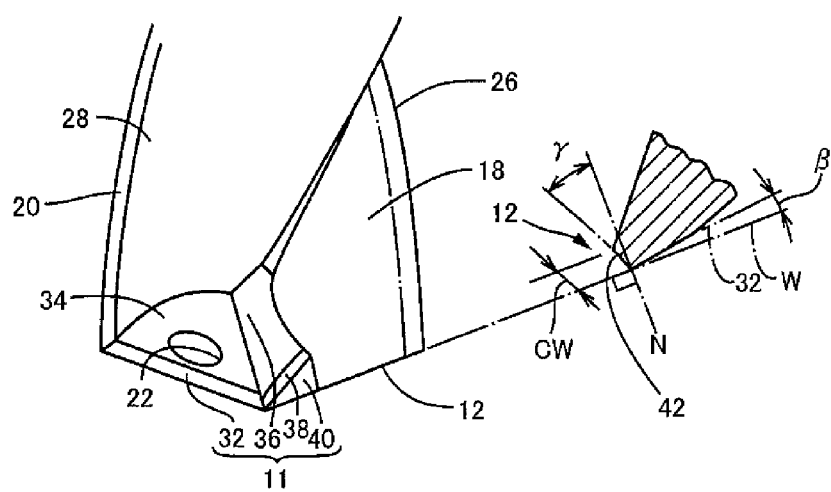
FIG. 2 is an enlarged view of a tip portion of the drill in the example of FIG. 1.
Figure 3:
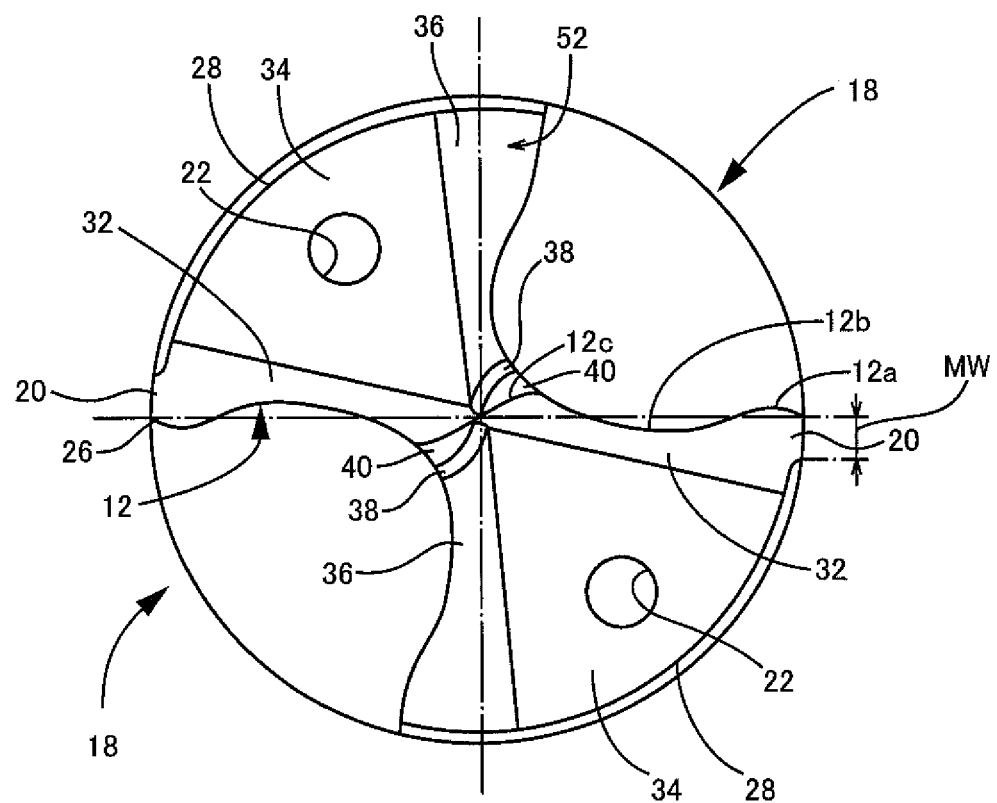
FIG. 3 is an enlarged view of a tip surface of the drill in the example of FIG. 1.
Figure 4:
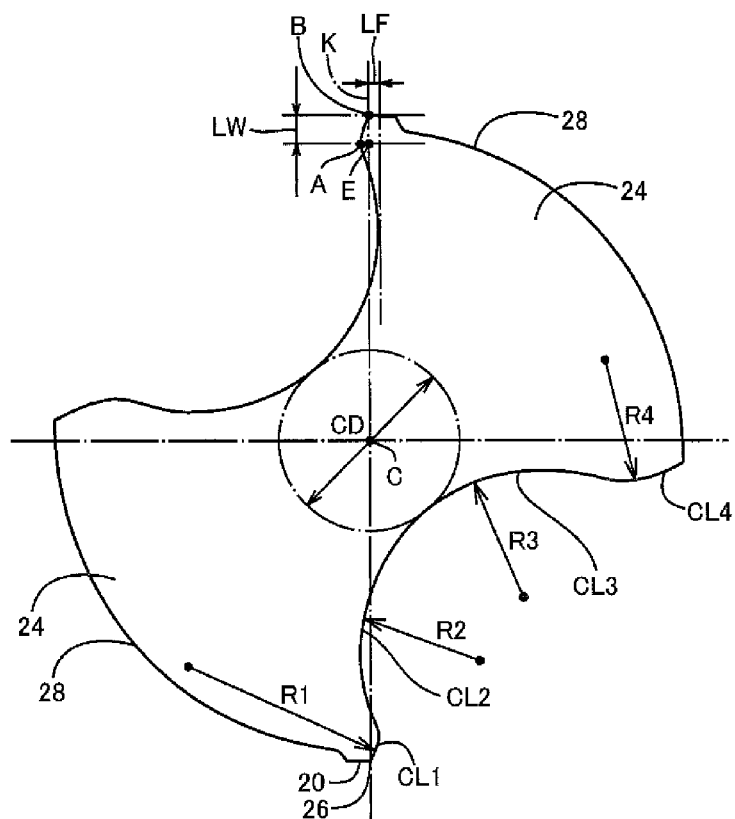
FIG. 4 is a view for explaining a cross section shape of a chip discharge flute at a cross section orthogonal to an axial center C of the drill of FIG. 1, and the view is a cross-sectional view taken from a line IV-IV of FIG. 1.
Figure 5:
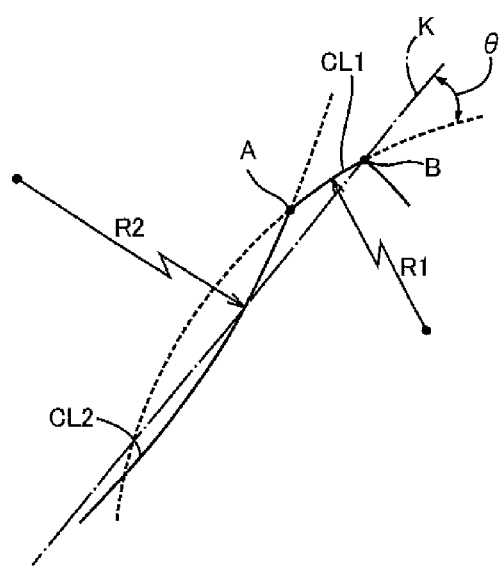
FIG. 5 is an enlarged view for specifically explaining a connecting shape between the first convex curve and the first concave curve in the cross section shape of the chip discharge flute of FIG. 4.
Figure 6:
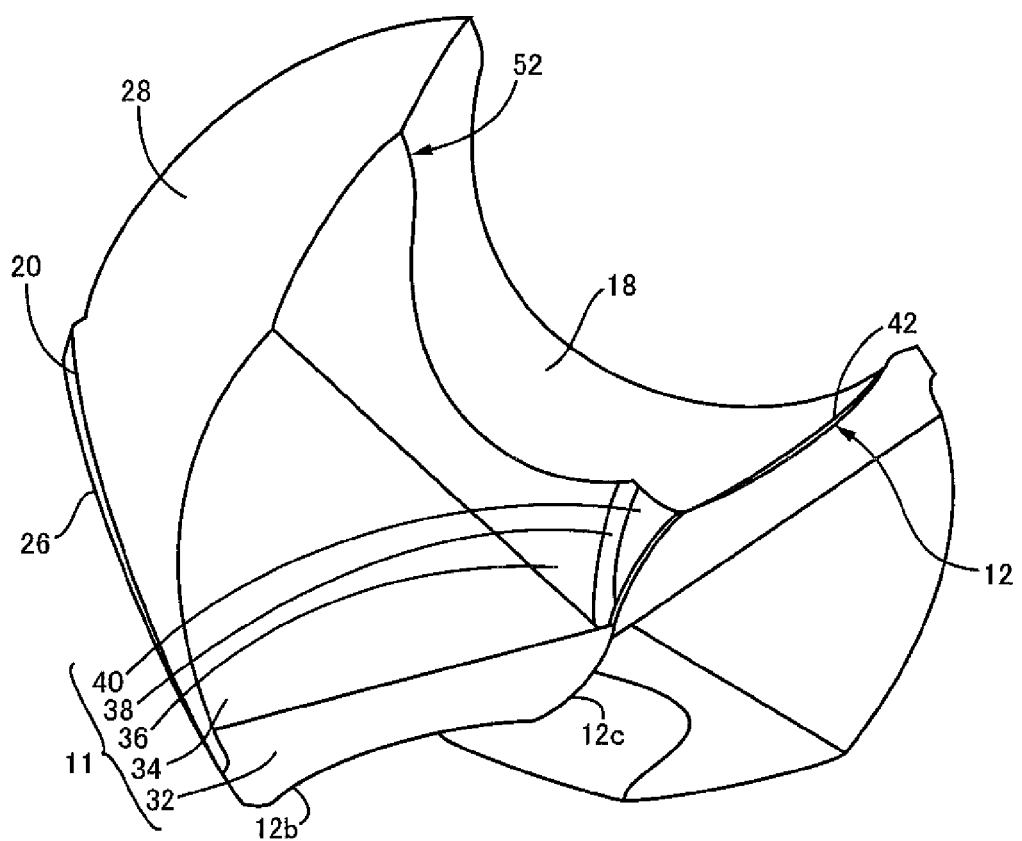
FIG. 6 is an enlarged perspective view of a tip portion of the drill in the example of FIG. 1.

FIG. 1 is a diagram of a drill 10 that is an example of the present invention and is a front view from a direction orthogonal to an axial center C. FIG. 2 is an enlarged view of a tip portion disposed with a cutting edge 12 of the drill 10. FIG. 3 is an enlarged view of a tip surface disposed with the cutting edge 12 of the drill 10. FIG. 4 is a cross-sectional view of the drill 10 cut along a surface orthogonal to the axial center C. FIG. 5 is an enlarged view of an end edge portion of an inner wall surface of a chip discharge flute 18 on a drill rotation direction side in the cross-sectional view. FIG. 6 is an enlarged perspective view of a tip portion of the drill 10.

The drill 10 is a two-flute twist drill for cutting special steel that is relatively difficult-to-machine material such as stainless steel, alloy steel, and titanium alloy with efficiency and axially integrally includes a shank portion 14 and a flute portion 16. The drill 10 is made of cemented carbide, and surfaces of a tip portion disposed with the cutting edges 12 etc., and the longitudinal flute portion 16 disposed with the chip discharge flutes 18 are coated with a hard film of TiAlN alloy. The flute portion 16 has a pair of the chip discharge flutes 18 twisted clockwise around the axial center C at a predetermined helix angle γn (angle between a line S orthogonal to the chip discharge flute 18 and a line T corresponding to the axial center C, e.g., about 30 degrees) and margins 20 are disposed along the chip discharge flutes 18. The pair of the chip discharge flutes 18 is opened in a C-shape in a tapered tip surface 11 of the drill 10 and respective cutting edges 12 are disposed on opening edges of the chip discharge flutes 18 on the side toward the rotation direction of the drill 10.

The drill 10 is provided with a back taper BT having a diameter reduced from the tip thereof toward the shank portion 14 in a range L including the tip portion and the flute portion 16. The back taper BT is set within a range of 0.10L/100 to 0.50L/100. A web thickness CD is a diameter inscribing bottoms of the chip discharge flutes 18 in the cross section of the drill 10 and is set within a range of 0.15D to 0.4D (where D is a drill cutting diameter).

The margin 20 is disposed along a leading edge 26 that is an end edge of a land 24 separated by the chip discharge flutes 18 on the drill rotation direction side. An outer circumferential surface of the drill 10 is made up of an outer circumferential surface of the margin 20, and a second clearance 28 disposed with a constant radial dimension after the margin 20. An outer diameter of the margin 20 is substantially the same dimension as a drill diameter (outer diameter of the cutting edges 12) D at the tip portion of the drill 10 and is gradually reduced to a smaller diameter from the tip portion of the drill 10 toward the shank portion 14 through the back taper BT of a predetermined angle in the back taper range L including the entire flute portion 16. A margin width MW of the margin 20 is set within a range of 0.02D to 0.010D.

The cutting edge 12 is made up of a convexly-curved cutting edge portion 12a formed on an outer circumferential side and a concavely-curved cutting edge portion 12b formed on an inner circumferential side. The tapered tip surface 11 of the drill 10 has a second flank 32, a third flank 34 having a clearance angle larger than the second flank 32, and a gash surface 36 having a clearance angle larger than the third flank 34, a longitudinal connecting concave surface 38, and a thinning surface 40 arranged adjacently to each other in this order from one cutting edge 12 of a pair of the cutting edges 12 toward the rear side of the rotation direction. The third flank 34 has an oil hole 22 helically disposed to longitudinally pass through the drill 10 in substantially parallel with the chip discharge flutes 18 and opened such that cutting fluid or air can be supplied to a cutting part as needed. An axial center side portion, i.e., a web thickness CD portion, of the cutting edge 12 is subjected to R-type thinning for forming the thinning surface 40 corresponding to a rake surface and an R-shaped axial center side cutting edge portion 12c smoothly curved on the bottom view of FIG. 3 is disposed to be smoothly connected to the concavely-curved cutting edge portion 12b. The longitudinal connecting concave surface 38 is a substantially radially longitudinal elongated surface located along a boundary line between the gash surface 36 and the thinning surface 40 and concaved in a width direction, i.e., a circumferential direction, so as to smoothly connect the both surfaces. A curvature radius R of the connecting concave surface 38 has a value within a range of 0.01D to 0.05D when the diameter of the cutting edge 12 of the drill 10 (drill diameter) is D.

The chip discharge flute 18 is cut by using a plurality of types of fluting grindstones and has an asymmetrical flute cross-sectional shape. As depicted in FIGS. 4 and 5, the inner wall surface of the chip discharge flute 18 is C-shaped, and the inner wall surface on the drill rotation direction side is made up of a first convex curve CL1 corresponding to the convexly-curved cutting edge portion 12a and having a curvature radius R1 and a first concave curve CL2 corresponding to the concavely-curved cutting edge portion 12b and having a curvature radius R2 intersecting with each other. As depicted in FIG. 4, the inner wall surface of the chip discharge flute 18 on the rear side of the drill rotation direction is made up of a second concave curve CL3 having a curvature radius R3 and smoothly connected to the first concave curve CL2 and a second convex curve CL4 having a curvature radius R4 and smoothly connected to the second concave curve CL3. In this example, since the first convex curve CL1 corresponding to the convexly-curved cutting edge portion 12a is a convex surface having the curvature radius R1 projecting in the rotation direction, a strength against crack is increased as compared to the drills of Patent Documents 1 and 2 having a chamfer-like flat surface.

As depicted in FIG. 5, the convexly-curved cutting edge portion 12a on the outer circumferential side and the concavely-curved cutting edge portion 12b on the inner circumferential side making up the cutting edge 12 have the first convex curve CL1 and the first concave curve CL2 corresponding thereto and intersecting with each other, and a slight ridgeline is formed at an intersection A thereof as indicated by a dashed-dotted line of FIG. 2. Since chips generated from the cutting edge are generated by the concavely-curved cutting edge portion 12b corresponding to the first concave curve CL2 and the inner wall surface, the intersection A is desirably positioned closer to the outer circumference as far as possible so as to acquire curled chips with a shorter overall length. Since the drill 10 of this example has the first convex curve CL1 corresponding to the convexly-curved cutting edge portion 12a on the outer circumferential side and the first concave curve CL2 corresponding to the concavely-curved cutting edge portion 12b on the inner circumferential side intersected with each other as described above, the intersection A, i.e., a connection point between the first convex curve CL1 and the first concave curve CL2, is preferably positioned closer to the outer circumference as compared to the conventional drill described in Patent Document 3 having the first convex curve CL1 and the first concave curve CL2 smoothly connected along a tangential direction.

In FIG. 4, the drill 10 of this example has a concave amount LF of the first concave curve CL2 set within a range of 0.01D to 0.05D (where D is the drill cutting diameter) relative to a reference line K connecting an outer circumferential point B, at which the outer circumferential surface of the drill 10 intersects with the first convex curve CL1, and the axial center C defined as a drill center point. Since the chips are generated by the concavely-curved cutting edge portion 12b corresponding to the first concave curve CL2 having the concave amount LF within the range and the inner wall surface and are formed into a preferred curled shape with a relatively shorter overall length, a durability performance of the drill 10 is enhanced and a thrust load during cutting is reduced.

In FIG. 4, the drill 10 of this example has a rake chamfer width LW set within a range of 0.008D to 0.06D (where D is the drill cutting diameter) as a radial distance from an intersection E between a straight line orthogonal to the reference line K, which passes through the intersection A of the first convex curve CL1 and the first concave curve CL2, and the reference line K, to the outer circumferential point B. Since a radial dimension of the first convex curve CL1 having the rake chamfer width LW set within the range is preferably made smaller as compared to the conventional drill described in Patent Document 3, the chip shape is curled with a relatively shorter overall length and a needle-like projection is made smaller.

In FIG. 4, the drill 10 of this example has a rake angle θ, i.e., an angle between the reference line K and the first convex curve CL1 at the outer circumferential point B, set to be negative so that a strength of a corner portion corresponding to the vicinity of the outer circumferential point B is enhanced. The drill 10 of this example has a web thickness CD set to 0.15D to 0.4D (where D is a drill cutting diameter) so that a cross section area of the chip discharge flute 18 is increased as much as possible while transverse strength is ensured.

In FIG. 4, the drill 10 of this example has the inner wall surface of the chip discharge flute 18 toward the rear side of the rotation direction made up of the second concave curve CL3 formed on the inner circumferential side and the second convex curve CL4 formed on the outer circumferential side adjacently to the second concave curve CL3, and the second convex curve CL4 is set to reach a heel portion 52 of the land 24. The second convex curve CL4 reinforces the heel portion 52 that is a rear end portion of the land 24.

In FIG. 4, the drill 10 of this example has the curvature radius R1 of the first convex curve CL1, the curvature radius R2 of the first concave curve CL2, the curvature radius R3 of the second concave curve CL3, and the curvature radius R4 of the second convex curve CL4 set such that R1 is within a range of 0.02D to 0.4D and that R2 is within a range of 0.15D to 0.5D, and a relationship of the curvature radius R2 of the first concave curve CL2 and the curvature radius R3 of the second concave curve CL3 is set within a range of 0.75≤R3/R2≤1.25.

As depicted in FIGS. 2 and 6, the cutting edge 12 of the drill 10 has a chamfer 42 that is a longitudinal surface along the ridgeline thereof for prevention of cutting edge crack. A chamfer width CW of the chamfer 42 is set within a range of 0.002D to 0.02D and an angle γ of the chamfer 42 is set within 10 to 35 degrees. As depicted in FIG. 2, the angle γ is the angle of the chamfer 42 relative to a line N perpendicular to a rotation surface M of the cutting edge 12. As depicted in FIG. 2, an orthogonal clearance angle β on a bottom portion of the drill 10 is a clearance angle that is an angle of the second flank 32 relative to the rotation surface of the cutting edge 12, and is set within a range of 9 to 20 degrees.

(Cutting Test 1)

A cutting test 1 performed by the present inventors will be described. The cutting test 1 was performed by using a hooked cutting edge drill TYPE-1, a hooked cutting edge drill TYPE-2 corresponding to the drill 10 of the inventive product, and a straight cutting edge drill having cutting edges formed straight under the following cutting test conditions. The cutting test 1 was performed by using a hooked cutting edge drill TYPE-2 drill having the first convex curve CL1 and the first concave curve CL2 intersecting with each other in accordance with the drill 10 of the inventive product and a hooked cutting edge drill TYPE-1 drill having the first convex curve CL1 and the first concave curve CL2 smoothly connected to each other in accordance with the drill of Patent Document 3 under the following cutting test conditions.

Figure 7:
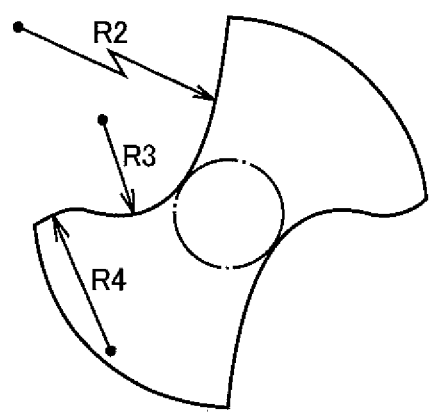
FIG. 7 is a view of a cross section shape of a straight cutting edge drill used for cutting in a cutting test 1.
Figure 8:
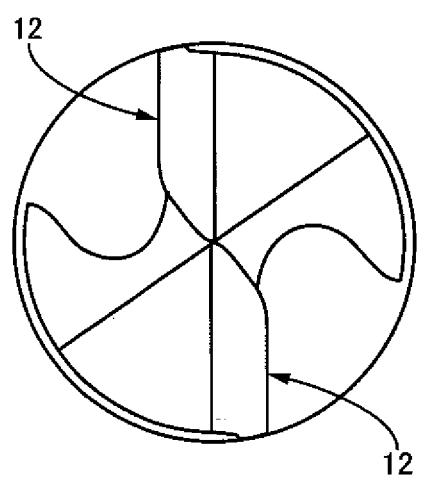
FIG. 8 is a view of a shape of a tip surface of the straight cutting edge drill used for cutting in the cutting test 1.
Figure 9:
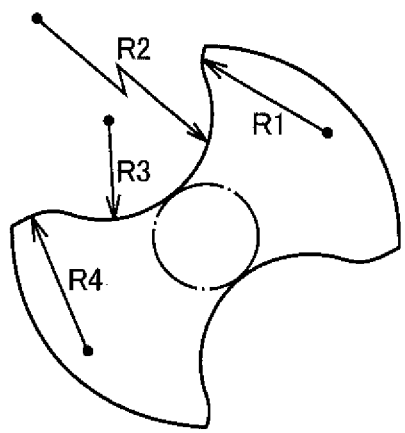
FIG. 9 is a view of a cross section shape of a hooked cutting edge drill (TYPE-2) used in the cutting test 1.
Figure 10:
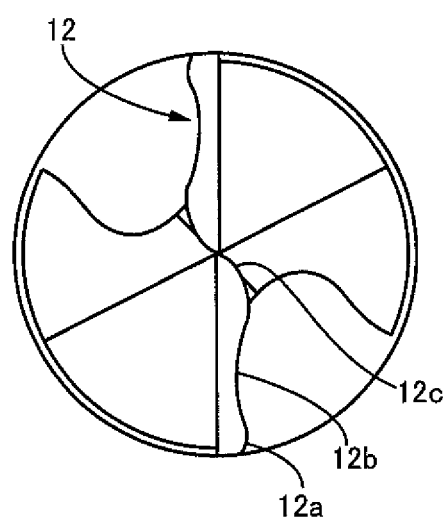
FIG. 10 is a view of a shape of a tip surface of the hooked cutting edge drill (TYPE-2) used in the cutting test 1.
Figure 15:
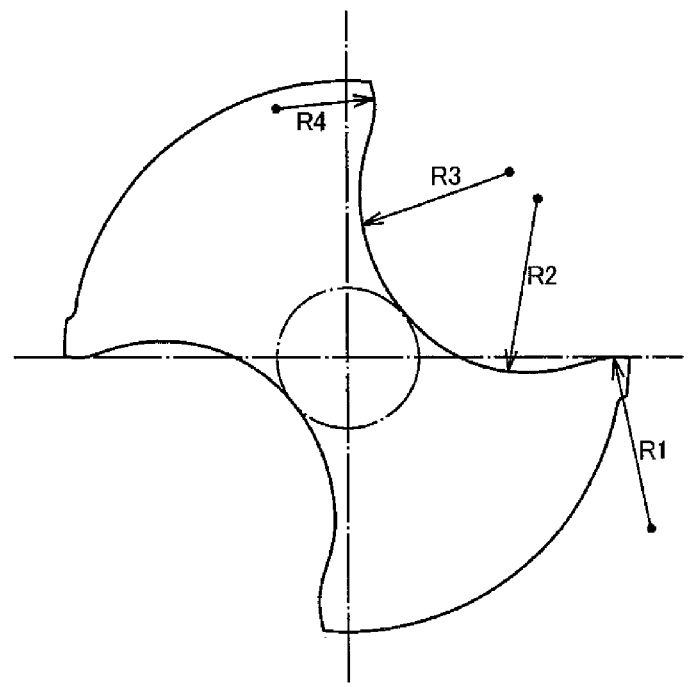
FIG. 15 is a view of a cross section shape of the hooked cutting edge drill (TYPE-1) used in the cutting test 1.
Figure 16:
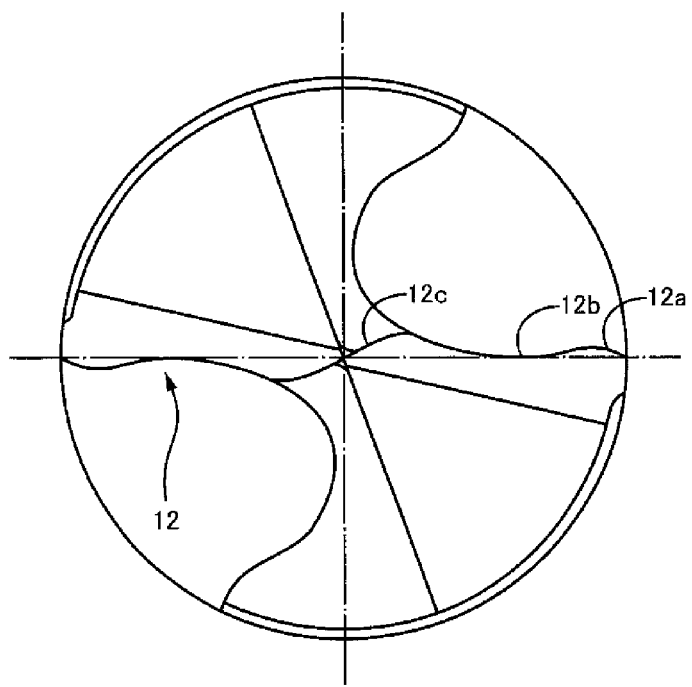
FIG. 16 is a view of a shape of a tip surface of the hooked cutting edge drill (TYPE-1) used in the cutting test 1.

<Straight Cutting Edge Drill>
Tool material: cemented carbide
Overall length: 100 mm
Flute length: 48 mm
Drill diameter: 6 mmϕ
Point angle: 140 degrees
Shape of chip discharge flute: R2=0.94D, R3=0.24D, R4=0.21D
Drill shape: shape depicted in a cross-sectional view of FIG. 7 and an end view of FIG. 8
Web thickness: 0.28D <Hooked Cutting Edge Drill TYPE-1>
Tool material: cemented carbide
Overall length: 100 mm
Flute length: 48 mm
Drill cutting diameter: 6 mmϕ
Point angle: 140 degrees
Shape of chip discharge flute: R1=0.16D, R2=0.29D, R3=0.29D, R4=0.21D
Drill shape: the drill having the first convex curve CL1 and the first concave curve CL2 smoothly continuing as depicted in a cross-sectional view of FIG. 9 and an end view of FIG. 10 and specifically depicted in a cross-sectional view of FIG. 15 and an end view of FIG. 16.
Web thickness: 0.28D
Concave amount LF: 0.09D
Rake chamfer width LW: 0.005D
R1 and R2 are in a circumscribing positional relationship.

<Hooked Cutting Edge Drill TYPE-2>
Tool material: cemented carbide
Overall length: 100 mm
Flute length: 48 mm
Drill cutting diameter: 6 mmϕ
Point angle: 140 degrees
Shape of chip discharge flute: R1=0.16D, R2=0.29D, R3=0.29D, R4=0.21D
Drill shape: the drill having the first convex curve CL1 and the first concave curve CL2 intersecting with each other as depicted in the cross-sectional view of FIG. 9 and the end view of FIG. 10 and specifically depicted in the cross-sectional view of FIG. 4 and the end view of FIG. 3.
Web thickness: 0.28D
Concave amount LF: 0.02D
Rake chamfer width LW: 0.05D
R1 and R2 are in an intersecting positional relationship.

Figure 11:
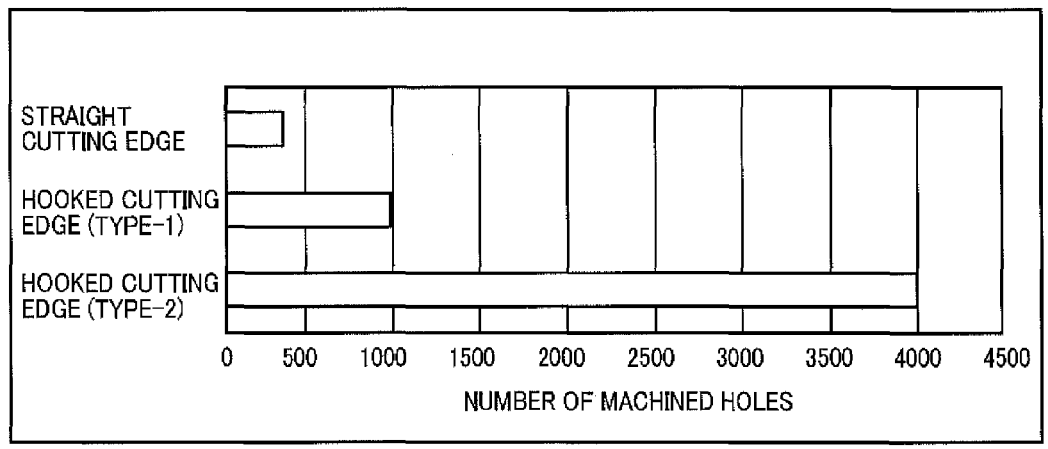
FIG. 11 is a bar graph depicting a result of the cutting test 1 with respect to the durability of the straight cutting edge drill, the hooked cutting edge drill (TYPE-1), and the hooked cutting edge drill (TYPE-2), respectively.

<Test Conditions>
Work material: SUS304
Drill diameter: 6 mm
Machining depth: 24 mm (blind hole)
Cutting speed: 100 m/min
Feed rate: 0.18 mm/rev
Step: none
Cutting oil: water-soluble (internal oil feed)
Coolant: 1.5 to 3.0 MPa FIGS. 11 to 14 depict a result of the cutting test 1. In FIG. 11, in the case of the straight cutting edge drill, the cutting edge of the drill cracked when the number of machined holes reached about 350. In the hole machining using the hooked drill TYPE-1, the cutting edge of the drill cracked when the number of machined holes reached about 1000. However, in the hole machining using the hooked drill TYPE-2 drill, the number of machined holes reached 4000. Therefore, the hooked cutting edge drill TYPE-2 corresponding to this example achieves a durability life ten or more times longer than the straight cutting edge drill and achieves the durability life four or more times longer than the hooked cutting edge drill TYPE-1.

Figure 12:
FIG. 12 is a photograph of a chip shape generated by the straight cutting edge drill for cutting in the cutting test 1.
Figure 13:
FIG. 13 is a photograph of a chip shape generated by the hooked cutting edge drill (TYPE-1) for cutting in the cutting test 1.
Figure 14:
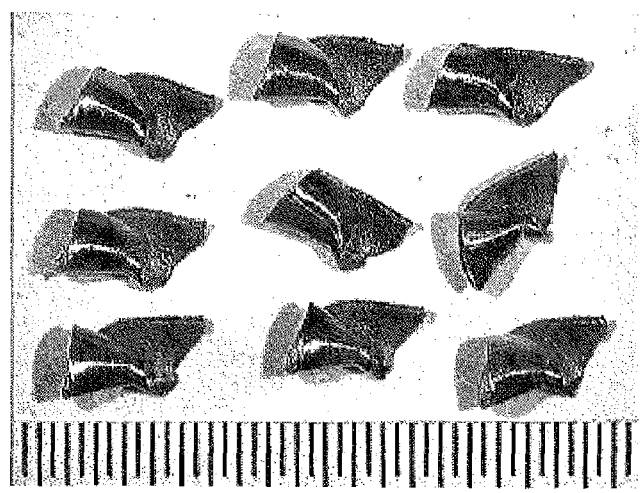
FIG. 14 is a photograph of a chip shape generated by the hooked cutting edge drill (TYPE-2) for cutting in the cutting test 1.

FIG. 12 depicts a chip shape from the straight cutting edge drill; FIG. 13 depicts a chip shape from the hooked cutting edge drill TYPE-1; and FIG. 14 depicts a chip shape from the hooked cutting edge drill TYPE-2. The chip shape from the straight cutting edge drill is less curled with a needle-like projection and has a relatively long overall length as depicted in FIG. 12 and, therefore, a discharge property of chips is hardly sufficiently achieved. The chip shape from the hooked cutting edge drill TYPE-1 is more curled with a relatively small needle-like projection and some chips have a short overall length as depicted in FIG. 13; however, the shape is not uniform since the chips having a long overall length are mixed at a high proportion. In contrast, as depicted in FIG. 14, the hooked cutting edge drill TYPE-2 produces a small and uniform chip shape without a needle-like projection, achieving the chip discharge property. These are considered to be the cause of the cutting test result.

(Cutting Test 2)

Figure 21:
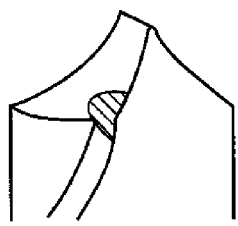
FIG. 21 is a view for specifically explaining a corner portion crack in the cutting test result.
Figure 22:
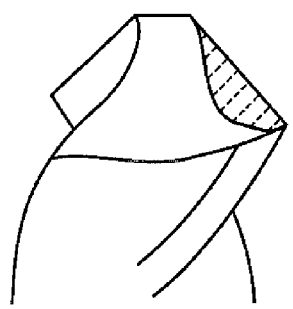
FIG. 22 is a view for specifically explaining significant wear in the cutting test result.
Figure 23:
FIG. 23 is a view for specifically explaining drill breakage in the cutting test result.
Figure 24:
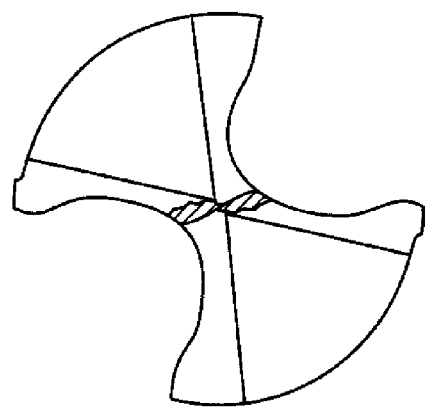
FIG. 24 is a view for specifically explaining a crack of a drill center portion in the cutting test result.

Eighteen types of drills having specifications changed from the same TYPE-2 drill used in the cutting test 1 were manufactured by way of trial as drills No. 1 to No. 18 as depicted in FIG. 17 and the drills No. 1 to No. 18 were used for cutting under the same conditions as the cutting test 1. FIG. 18 depicts test results of the drills No. 1 to No. 18. In FIG. 18, a circle indicates an excellent result and a triangle indicates a less favorable result, while a cross mark indicates an unfavorable result. "Significant flank wear width" indicates a state of significant flank wear, a cutting edge crack, a center portion crack, or a hole diameter expansion, and a cross mark indicates drill breakage due to high cutting resistance. A corner portion crack indicates a cracked state in the part exemplarily illustrated in FIG. 21; significant wear indicates a significantly worn state of the part depicted in FIG. 22; breakage indicates a broken state of the drill depicted in FIG. 23; and a center portion crack is a cracked state in the part depicted in FIG. 24.

FIG. 18 depicts a result of the cutting test 2. In FIG. 18, the drills No. 2 to No. 4 and No. 7 to No. 9 produced excellent results in the chip shape, the thrust load, and the durability performance. In other words, chips were acquired in a shape having a shorter uniform overall length without a needle-like projection with good discharge property, and the thrust load for feeding the drills in the axial center C direction was relatively light at the feed rate of 0.15 mm/rev in the cutting test 2. The durability performance same as the durability result depicted in TYPE-2 of FIG. 11 was acquired. However, the drills No. 1, No. 5, No. 6, and No. 10 to No. 18 mainly produced less favorable results indicated by triangles or unfavorable results indicated by cross marks in at least one of the chip shape and the thrust load and had one of the drill breakage, the corner portion crack, and the significant wear in terms of durability performance evaluation.

The configurations of the drills No. 1, No. 5, No. 6, and No. 10 to No. 18 without good durability performance evaluation lead to the following analysis. First, the significant flank wear width of the drill No. 1 is considered to result from an excessively small orthogonal clearance angle β of the second flank 32 following the cutting edge, and the cutting edge crack of the drill No. 5 is considered to result from an excessively large orthogonal clearance angle β of the second flank 32 following the cutting edge. The cutting edge crack of the drill No. 6 is considered to result from an excessively small chamfer width CW of the chamfer 42 disposed on the ridgeline of the cutting edge 12, and the drill breakage of the drill No. 10 is considered to be attributable to larger cutting resistance due to an excessively large chamfer width CW of the chamfer 42 of the cutting edge 12. The drill breakage of the drill No. 11 is considered to result from larger cutting resistance due to an excessively small cutting edge chamfer angle γ, and the cutting edge crack of the drill No. 12 is considered to be attributable to an excessively large cutting edge chamfer angle γ. The drill breakage of the drill No. 13 is considered to result from larger cutting resistance due to an excessively small curvature radius R of the connecting concave surface 38, and the center portion crack of the drill No. 14 is considered to result from an excessively large curvature radius R of the connecting concave surface 38. The drill breakage of the drill No. 15 is considered to result from larger cutting resistance due to an excessively small back taper BT, and the hole diameter expansion of the drill No. 16 is considered to result from an excessively large back taper BT. The hole diameter expansion of the drill No. 17 is considered to result from reduced accuracy of hole cutting due to an excessively small margin width MW, and the drill breakage of the drill No. 18 is considered to result from increased cutting resistance due to an excessively large margin width MW.

Considering each of the excessively large values or the excessively small values estimated as the causes of the insufficient durability performance of the drills No. 1, No. 5, No. 6, and No. 10 to No. 18, it is desirable that the orthogonal clearance angle β of the flank following the cutting edge 12 is within an angular range of 9 to 20 degrees, that the chamfer width CW of the chamfer 42 disposed on the ridgeline of the cutting edge 12 is within a range of 0.002D to 0.02D, that the cutting edge chamfer angle γ of the chamfer 42 disposed on the ridgeline of the cutting edge 12 is within a range of 10 to 35 degrees, that curvature radius R of the connecting concave surface 38 is within a range of 0.01D to 0.05D, that the back taper BT is within a range of 0.01L/100 to 0.05L/100, and that the margin width MW of the drill is within a range of 0.02D to 0.10D.

(Cutting Test 3)

Twelve types of drills having cutting edges changed from the TYPE-2 drill used in the cutting test 2 were manufactured by way of trial as drills No. 1 to No. 12 as depicted in FIG. 19 and the drills No. 1 to No. 12 were used for cutting under the same conditions as the cutting test 2. FIG. 20 depicts test results of the drills No. 1 to No. 12. In FIG. 20, a circle indicates an excellent result and a triangle indicates a less favorable result as compared to a circle, while a cross mark indicates an unfavorable result. In FIG. 20, a corner portion crack indicates a cracked state in the part exemplarily illustrated in FIG. 21; significant wear indicates a significantly worn state of the part depicted in FIG. 22; and breakage indicates a broken state of the drill depicted in FIG. 23.

As depicted in the cutting test results of FIG. 20, the drills No. 1 to No. 3 produced excellent results in the chip shape, the thrust load, and the durability performance. In other words, chips were acquired in a shape having a shorter uniform overall length without a needle-like projection with good discharge property, and the thrust load for feeding the drills in the axial center C direction was relatively light at the feed rate of 0.15 mm/rev in the cutting test 3. The durability performance same as the durability result depicted in TYPE-2 of FIG. 11 was acquired. However, the drills No. 4 to No. 12 produced less favorable results indicated by triangles or unfavorable results indicated by cross marks in at least one of the chip shape and the thrust load and had one of the drill breakage, the corner portion crack, and the significant wear in terms of durability performance evaluation.

The configurations of the drills No. 4 to No. 12 without good durability performance evaluation lead to the following analysis. First, the breakage of the drill No. 4 and the drill No. 11 due to clogging of chips is considered to be attributable to reduction in discharge property derived from an excessively small cross section area of the chip discharge flutes 18. In other words, it is estimated that the drill No. 4 has a radius ratio R3/R2 set to an excessively small value of 0.7, which makes the curvature radius R3 relatively smaller than the curvature radius R2, and therefore has an excessively small cross section area of the chip discharge flutes 18, and that the drill No. 11 has an excessively large web thickness CD of 0.42D and therefore has an excessively small cross section area of the chip discharge flutes 18. The breakage of the drill No. 5 and the drill No. 10 due to tool rigidity shortage is considered to be attributable to an insufficient drill cross section area. In other words, it is estimated that the drill No. 5 has the radius ratio R3/R2 set to an excessively large value of 1.3, which makes the curvature radius R3 relatively larger than the curvature radius R2, and therefore has an excessively small cross section area of the chip discharge flutes 18, and that the drill No. 10 has an excessively small web thickness CD of 0.13D and therefore has an excessively small cross section area of the chip discharge flutes 18. The corner portion crack of the drills No. 6 to No. 8 and No. 12 is considered to be attributable to the strength or rigidity shortage of the corner portion. In other words, it is considered that the drill No. 6 has the rake chamfer width LW set to an excessively small value of 0.005D and the curvature radius R1 of the first convex curve CL1 set to an excessively small value of 0.018D and therefore cannot achieve the strength of the corner portion. It is considered that the drill No. 7 has the radius ratio R3/R2 set to an excessively large value of 1.53 and the concave amount LF of the curvature radius R2 from the reference line K toward the rear side of the rotation direction set to an excessively large value of 0.06D and therefore cannot achieve the strength of the corner portion. It is considered that the drill No. 8 has the curvature radius R1 of the first convex curve CL1 set to an excessively large value of 0.42D, which makes the convexly-curved cutting edge portion 12a corresponding to the first convex curve CL1 close to a straight line because of a smaller swelling-out amount in the rotation direction, and therefore cannot achieve the strength of the convexly-curved cutting edge portion 12a, i.e., the strength of the corner portion. It is considered that the drill No. 12 has the curvature radius R2 set to an excessively small value of 0.12D and therefore tends to crack in the corner portion. The significant wear of the drill No. 9 is considered to be attributable to a lower cutting efficiency increasing a thrust load for maintaining a predetermined feed rate (0.15 mm/rev). In other words, it is considered that since the drill No. 9 has the concave amount LF of the curvature radius R2 from the reference line K toward the rear side of the rotation direction set to a negative value of −0.02D, the radius ratio R3/R2 set to an excessively small value of 0.56, which makes the value of the curvature radius R2 about twice larger than the curvature radius R3, the curvature radius R2 set to a large value of 0.52D, and the rake chamfer width LW set to an excessively large value of 0.09D, a cutting amount is made relatively smaller in the cutting edge 12 with the large curvature radius R2 on the rotation direction side relative to the reference line K, accordingly increasing the thrust load.

Considering each of the excessively large values or the excessively small values estimated as the causes of the insufficient durability performance of the drills No. 4 to No. 12, it is desirable that the concave amount LF of the first concave curve CL2 is within a range of 0.01D to 0.05D, that the rake chamfer width LW is within a range of 0.008D to 0.06D, that the web thickness is within a range of 0.15D to 0.4D, that the curvature radius R1 of the first convex curve CL1 is within a range of 0.02D to 0.4D, that the curvature radius R2 of the first concave curve CL2 is within a range of 0.15D to 0.5D, and that the curvature radius ratio R3/R2 between the first concave curve CL2 and the second concave curve CL3 is within a range of 0.75 to 1.25.

As described above, since the drill 10 of this example includes the chip discharge flute 18 opened in the tip surface 11 and the cutting edge 12 formed on the intersecting portion of the chip discharge flute 18 between the inner wall surface toward the drill rotation direction and the second flank (tip flank) 32 formed on the tip surface 11, has the cutting edge 12 made up of the concavely-curved cutting edge portion 12b formed on the inner circumferential side and the convexly-curved cutting edge portion 12a formed on the outer circumferential side, and has the first convex curve CL1 corresponding to the convexly-curved cutting edge portion 12a and the first concave curve CL2 corresponding to the concavely-curved cutting edge portion 12b intersecting with each other in the cross section orthogonal to the axial center C of the drill 10, chips generated from the cutting edge 12 have a uniform shape curled without a needle-like projection with a correspondingly shortened overall length and are smoothly discharged with enhanced discharge property and, therefore, the tool life of the drill 10 is further improved. Since the second flank (tip flank) 32 following the cutting edge 12 on the tip surface 11 is provided with the orthogonal clearance angle β within an angular range of 9 to 20 degrees and the ridgeline of the cutting edge 12 is provided with the chamfer 42 having the chamfer width CW within a range of 0.002D to 0.02D, wear and cutting edge crack of the second flank 32 or the third flank 34 are suppressed and the cutting resistance is reduced, resulting in suppression of the breakage of the drill 10. If the orthogonal clearance angle β of the flank falls below 9 degrees, the wear of the flank increases and a sufficient tool life cannot be acquired. If the orthogonal clearance angle β of the second flank (tip flank) 32 exceeds 20 degrees or if the chamfer width CW of the cutting edge 12 falls below 0.002D, a reduction in strength causes a crack of the cutting edge 12 and, if the chamfer width CW of the cutting edge 12 exceeds 0.02D, the cutting resistance increases and the breakage of the drill 10 tends to occur.

According to the drill 10 of this example, since the cross section orthogonal to the axial center C has the concave amount LF of the first concave curve CL2 set to 0.01D to 0.05D relative to the reference line K connecting the outer circumferential point B, at which the outer circumferential surface of the drill 10 intersects with the first convex curve CL1, and the axial center C defined as the drill center point, the chip shape is curled with a relatively shorter overall length and the durability performance is enhanced while the thrust load during cutting is reduced. If the concave amount LF of the first concave curve CL2 becomes less than 0.01D, the wear of the drill 10 increases and the durability performance deteriorates. If the concave amount LF of the first concave curve CL2 exceeds 0.05D, the corner portion of the drill 10 cracks.

According to the drill 10 of this example, since the cross section orthogonal to the axial center C has the rake chamfer width LW of 0.008D to 0.06D (where D is the drill cutting diameter) that is a distance from the intersection E between a straight line orthogonal to the reference line K, which passes through the intersection A of the first convex curve CL1 and the first concave curve CL2, and the reference line K, to the outer circumferential point B, the chip shape is curled with a relatively shorter overall length and the durability performance is enhanced while the thrust load during cutting is reduced. If the rake chamfer width LW becomes less than 0.008D, the corner portion of the drill cracks. If the rake chamfer width LW exceeds 0.06D, the wear of the drill increases and the durability performance deteriorates.

According to the drill 10 of this example, since the tip surface 11 includes the second flank (tip flank) 32 and the third flank (tip flank) 34 disposed on the rear side of the rotation direction of one of the cutting edges 12, the gash surface 36 formed adjacently to the third flank with a clearance angle larger than the third flank, the thinning surface 40 adjacent to the inner circumferential portion of the other cutting edge 12 located on the rear side of the rotation direction of the cutting edge 12, and the longitudinal connecting concave surface 38 located along the boundary line between the gash surface 36 and the thinning surface 40 to connect the both surfaces and concaved in a width direction, and the connecting concave surface 38 has the curvature radius R within a range of 0.01D to 0.05D. As a result, since the curvature radius R of the connecting concave surface 38 is 0.01D to 0.05D, the lower cutting resistance leads to the prevention of the breakage of the drill 10 and the prevention of the crack of the center portion near the axial center of the cutting edge 12. If the curvature radius R falls below 0.01D, the chip discharge property deteriorates and the cutting resistance increases, causing the crack of the drill 10, and if the curvature radius R falls below 0.05D, the strength deteriorates in the center portion near the axial center of the cutting edge 12 and the portion tends to crack.

According to the drill 10 of this example, the outer circumferential surface of the drill is provided with the margin 20 having the margin width MW of 0.02D to 0.10D and the back taper BT of 0.10L/100 to 0.50L/100 (where L is an axial length of the back taper). Therefore, since the cutting resistance of the drill 10 is reduced and the expansion of the machined hole diameter is suppressed, a machining accuracy is improved. If the back taper BT falls below 0.10L/100, the cutting resistance increases and the breakage of the drill is more likely to occur, and if the back taper BT exceeds 0.50L/100, the cut hole diameter increases and the machining accuracy deteriorates.

The drill 10 of this example has the web thickness CD of 0.15D to 0.4D (where D is the drill cutting diameter). Therefore, since the transverse strength of the drill 10 is enhanced within a range in which chip discharge performance is achieved, the durability performance of the drill 10 is enhanced. If the web thickness CD falls below 0.15D, the strength of the drill 10 is reduced and the breakage tends to occur and if the web thickness CD exceeds 0.4D, the cross section area of the chip discharge flute 18 becomes smaller and deteriorates the chip discharge performance and the breakage tends to occur.

According to the drill 10 of this example, the chamfer 42 disposed on the ridgeline of the cutting edge 12 has the cutting edge chamfer angle γ of 10 to 35 degrees. The cutting edge chamfer angle γ is a supplementary angle of the angle relative to the rotation surface of the cutting edge 12 on the plane orthogonal to the cutting edge 12. Therefore, since the strength of the cutting edge 12 is improved within a range in which the cutting edge 12 is prevented from cracking, the durability performance of the drill 10 is enhanced. If the cutting edge chamfer angle γ falls below 10 degrees, the strength of the cutting edge 12 is reduced and the cutting edge 12 tends to crack, and if the cutting edge chamfer angle γ exceeds 35 degrees, the cutting resistance increases and the breakage of the drill 10 tends to occur.

According to the drill 10 of this example, since the cross section orthogonal to the axial center C has the inner wall surface of the chip discharge flute 18 on the side toward rotation direction opposite to the drill rotation direction made up of the second concave curve CL3 formed on the inner circumferential side and the second convex curve CL4 formed on the outer circumferential side adjacently to the second concave curve CL3, and the second convex curve CL4 reaches the heel portion, the chip shape is curled with a relatively shorter overall length and the durability performance is enhanced while the thrust load during cutting is reduced, and since the first convex curve and the second convex curve respectively reinforce the corner portion corresponding to the both end portions, i.e., the heel portion and the margin portion, of an opening edge opened in a C-shape or a U-shape in the tip surface of the chip discharge flute 18, the corner portion and the margin portion are prevented from cracking and the durability of the drill is enhanced.

Since the drill 10 of this example is set to R1: 0.02D to 0.4D and R2: 0.15D to 0.5D when R1 is the curvature radius of the first convex curve CL1 and R2 is the curvature radius of the first concave curve CL2, the chip shape is curled with a relatively shorter overall length and the durability performance is enhanced while the thrust load during cutting is reduced. If R1 becomes less than 0.02D or exceeds 0.4D, a crack occurs in the corner portion. If the curvature radius R2 becomes less than 0.15D, the corner portion easily cracks and if exceeding 0.5D, the wear becomes significant.

Since the drill 10 of this example has a radius ratio between the curvature radius R2 of the first concave curve CL2 and the curvature radius R3 of the second concave curve CL3 within a range of 0.75≤R3/R2≤1.25, the chip discharge flute is formed into a cross section shape having a size without clogging of chips within a range in which the rigidity of the drill 10 is ensured. If R3/R2 becomes less than 0.75, the cross section area of the chip discharge flute becomes too small and the clogging of chips occurs and causes the breakage of the drill 10. If R3/R2 exceeds 1.25, the cross section area of the chip discharge flute 18 becomes larger and a cross section area of the drill main body becomes smaller, causing the breakage of the drill 10 due to rigidity shortage.

According to the drill 10 of this example, since the rake angle θ is an angle between the reference line K and the first convex curve CL1 at the outer circumferential point B and is set to be negative, the strength of the corner portion corresponding to the angle near the outer circumferential point B is enhanced to prevent the crack thereof and the durability performance of the drill 10 is enhanced.

According to the drill 10 of this example, since the drill 10 is coated at least on a surface of the tip portion with a hard film of TiAlN alloy, the surface of the tip portion subjected to higher pressure and friction is coated with the hard film and, therefore, the durability performance of the drill 10 is enhanced.

Although the example of the present invention has been described in detail with reference to the drawings, the present invention is applied in other forms.

For example, although the chamfer 42 of the drill 10 of the example is a flat surface, the chamfer 42 may be a convex surface or an R-surface.

Although the first convex curve CL1 and the first concave curve CL2 intersecting at the intersection A are arcs having the curvature radiuses R1 and R2 in the drill 10 of this example, the curves may not necessarily be arcs.

Although the flute portion 16 of the drill 10 of this example is provided with the pair of the chip discharge flutes 18 twisted clockwise around the axial center C at the predetermined helix angle γ (e.g., about 30 degrees), the present invention is applicable to various drills such as a twist drill having the chip discharge flutes 18 twisted anticlockwise around the axial center C, a straight cutting edge drill having the chip discharge flutes 18 parallel to the axial center C, a drill having the one, two, three or more chip discharge flutes 18, and a double margin drill having one land disposed with two margins.

Although the drill 10 of this example is disposed with the oil hole 22 longitudinally passing therethrough in the axial center C direction, the oil hole 22 may be disposed as needed depending on quality etc., of a work material. The margin 20 may not necessarily be disposed.

Although the cross section orthogonal to the axial center C of the drill 10 of this example has the inner wall surface of the chip discharge flute 18 on the side toward rotation direction opposite to the rotation direction made up of the second concave curve CL3 formed on the inner circumferential side and the second convex curve CL4 formed on the outer circumferential side adjacently to the second concave curve CL3, and the second convex curve CL4 is set to reach the heel portion 52 of the land 24, the second convex curve CL4 is for the purpose of reinforcing the heel portion 52 of the land 24 and therefore may not be curved or may be removed as needed depending on a material. Since the second concave curve CL3 is a portion less involved with the formation of curling of chips and may be provided to the extent that a gap from a chip is formed, the curvature radius R3 may be changed within a range not affecting the curling of chips and the discharge of chips.

Although the drill 10 of the example is made of base material that is super hard tool material such as cemented carbide, another tool material such as high-speed steel is also employable. Intermetallic compounds, a diamond film, etc., are employable as a hard film disposed on the base material for enhancing a cutting durability.

The suitable intermetallic compounds are metals of the groups IIIb, IVa, Va, and VIa of the periodic table of the elements, for example, carbides, nitrides, and carbonitrides of Al, Ti, V, Cr, etc., or mutual solid solutions thereof and, specifically, TiAlN alloy, TiCN alloy, TiCrN alloy, TiN alloy, etc. are preferably used. Although a hard film of such an intermetallic compound is preferably disposed by a PVD method such as an arc ion plating method and a sputtering method, the hard film may be disposed by another film formation method such as a plasma CVD method.

The above description is merely an embodiment of the present invention and the present invention may be implemented in variously modified and improved forms based on the knowledge of those skilled in the art within a range not departing from the spirit thereof.

NOMENCLATURE OF ELEMENTS

10: drill
12: cutting edge
12a: convexly-curved cutting edge portion
12b: concavely-curved cutting edge portion
CL1: first convex curve
CL2: first concave curve
18: chip discharge flute
32: second flank (tip flank)
34: third flank (tip flank)
36: gash surface
38: longitudinal connecting concave surface
40: thinning surface
42: chamfer
A: intersection of the first convex curve and the first concave curve
B: outer circumferential point
C: axial center (drill center point)
LF: concave amount of the first concave curve
LW: rake chamfer width
K: reference line
θ: rake angle
R1, R2, R3, R4: curvature radius
CL3: second concave curve
CL4: second convex curve

The invention claimed is:

1. A drill comprising:
a chip discharge flute opened in a tip surface; and a cutting edge formed at an intersecting portion between an inner wall surface of the chip discharge flute on a side toward a drill rotation direction and a tip flank formed on the tip surface, the cutting edge being made up of a concavely-curved cutting edge portion formed on an inner circumferential side and a convexly-curved cutting edge portion formed on an outer circumferential side, the drill further comprising:
a cross section orthogonal to an axial center having a first convex curve corresponding to the convexly-curved cutting edge portion and a first concave curve corresponding to the concavely-curved cutting edge portion intersecting with each other at an intersection, and a ridgeline being formed at the intersection,
the tip flank following the cutting edge on the tip surface having an orthogonal clearance angle β formed within an angular range of 9 to 20 degrees, and
a ridgeline of the cutting edge having a chamfer formed with a width CW within a range of 0.002D to 0.02D, wherein D is an outer diameter of the drill.

2. The drill of claim 1, wherein the cross section orthogonal to the axial center has a concave amount LF of the first concave curve set to 0.01D to 0.05D relative to a reference line connecting an outer circumferential point, at which an outer circumferential surface of the drill intersects with the first convex curve, and a drill center point.

3. The drill of claim 2, wherein a rake chamfer width LW is a distance from an intersection between a straight line orthogonal to the reference line, which passes through the intersection of the first convex curve and the first concave curve, and the reference line, to the outer circumferential point and is 0.008D to 0.06D.

4. The drill of claim 2, wherein a rake angle is an angle between the reference line and the first convex curve at the outer circumferential point and is set to be negative.

5. The drill of claim 1, wherein the tip surface includes a flank disposed on a rear side of the rotation direction of the cutting edge, a gash surface formed adjacently to the flank with a clearance angle larger than the flank, a thinning surface adjacent to an inner circumferential portion of another cutting edge located on the rear side of the rotation direction of the cutting edge, and a longitudinal connecting concave surface located along a boundary line between the gash surface and the thinning surface to connect the both surfaces and concaved in a width direction, and wherein the connecting concave surface has a curvature radius R within a range of 0.01D to 0.05D.

6. The drill of claim 1, wherein the outer circumferential surface of the drill is provided with a margin having a margin width MW of 0.02D to 0.10D and a back taper of 0.10L/100 to 0.50L/100, wherein L is an axial length of the back taper.

7. The drill of claim 1, wherein the drill has a web thickness CD of 0.15D to 0.4D.

8. The drill of claim 1, wherein the chamfer disposed on the ridgeline of the cutting edge has a cutting edge chamfer angle γ of 10 to 35 degrees.

9. The drill of claim 1, wherein the cross section orthogonal to the axial center has the inner wall surface of the chip discharge flute on the side toward rotation direction opposite to the drill rotation direction made up of a second concave curve formed on the inner circumferential side and a second convex curve formed on the outer circumferential side adjacently to the second concave curve and reaching a heel portion, and wherein the second convex curve smoothly connects via the second concave curve to the first concave curve.

10. The drill of claim 9, wherein when R1, R2, R3, and R4 are a curvature radius of the first convex curve, a curvature radius of the first concave curve, a curvature radius of the second concave curve, and a curvature radius of the second convex curve, respectively, the drill is set to R1: 0.02D to 0.4D and R2: 0.15D to 0.5D.

11. The drill of claim 9, wherein a relationship between the curvature radius R2 of the first concave curve and the curvature radius R3 of the second concave curve is 0.75≤R3/R2≤1.25.

12. The drill of claim 1, wherein the drill is coated at least on a tip portion surface with a hard film.

* * * * *